(12) United States Patent
Zhang et al.

(10) Patent No.: US 7,437,382 B2
(45) Date of Patent: Oct. 14, 2008

(54) METHOD AND SYSTEM FOR RANKING MESSAGES OF DISCUSSION THREADS

(75) Inventors: Benyu Zhang, Beijing (CN); Zheng Chen, Beijing (CN); Wensi Xi, Beijing (CN); Hua-Jun Zeng, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/130,803

(22) Filed: May 16, 2005

(65) Prior Publication Data

US 2006/0112392 A1 May 25, 2006

Related U.S. Application Data

(63) Continuation-in-part of application No. 10/957,329, filed on Oct. 1, 2004, and a continuation-in-part of application No. 10/846,835, filed on May 14, 2004, now Pat. No. 7,346,621.

(51) Int. Cl.
*G06F 17/30* (2006.01)
(52) U.S. Cl. .............................. 707/102; 707/3; 709/217
(58) Field of Classification Search .................. 707/3, 707/101; 718/102
See application file for complete search history.

(56) References Cited

U.S. PATENT DOCUMENTS 6,601,075 B1 7/2003 Huang et al.
7,143,091 B2 * 11/2006 Charnock et al. ............... 707/5
7,185,065 B1 * 2/2007 Holtzman et al. ........... 709/217
2003/0055711 A1 * 3/2003 Doherty ........................ 705/10
2005/0256832 A1 11/2005 Zhang et al.

OTHER PUBLICATIONS

Baeza-Yates, Ricardo et al., "Web Structure, Dynamics and Page Quality," Lecture Notes in Computer Science, Proceedings of the 9th International Symposium on String Processing and Information Retrieval, vol. 2476, Sep. 2002, pp. 117-130.

Bharat, Krishna and Monika R. Henzinger, "Improved Algorithms for Topic Distillation in a Hyperlinked Environment," Proceedings of the 21st Annual International ACM-SIGIR Conference on Research and Development in Information Retrieval, Australia, 1998, 9 pages.

(Continued)

*Primary Examiner*—John Cottingham
*Assistant Examiner*—Alexandria Y Bromell
(74) *Attorney, Agent, or Firm*—Perkins Coie LLP

(57) ABSTRACT

A method and system for ranking messages of discussion threads based on relationships between messages and authors is provided. The ranking system defines an equation for attributes of a message and an author. The equations define the attribute values and are based on relationships between the attribute and the attributes associated with the same type of object, and different types of objects. The ranking system iteratively calculates the attribute values for the objects using the equations until the attribute values converge on a solution. The ranking system then ranks the messages based on attribute values.

8 Claims, 4 Drawing Sheets

OTHER PUBLICATIONS

Brin, Sergey and Lawrence Page, "The Anatomy of a Large-Scale Hypertextual Web Search Engine," Computer Networks and ISDN Systems, vol. 30, 1998, 25 pages.

Callan, James P., "Passage-Level Evidence in Document Retrieval," Proceedings of the 17th Annual International ACM SIGIR Conference on Research and Development in Information Retrieval, Jul. 1994, Ireland, 9 pages.

Chakrabarti, Soumen et al., "Automatic Resource Compilation by Analyzing Hyperlink Structure and Associated Text," Proceedings of the 7th International World Wide Web, 1998, 13 pages.

Chakrabarti, Soumen et al., "Mining the Web's Link Structure," Computer, Aug. 1999, © 1999 IEEE, pp. 60-67.

Chakrabarti, Soumen, Mukul Joshi and Vivek Tawde, "Enhanced Topic Distillation using Text, Markup Tags, and Hyperlinks," In Proceedings of the 24th Annual International ACM SIGIR Conference on Research and Development in Information Retrieval, New Orleans, 2001, © 2001 ACM, pp. 208-216.

Chen, Jinlin et al., "Function-Based Object Model Towards Website Adaptation," In Proceedings of the 10th International World Wide Web Conference, China, May 2001, pp. 587-596.

Chen, Zheng et al., "A Unified Framework for Web Link Analysis," Wise 2002, 8 pages.

Cohn, David and Huan Chang, "Learning to Probabilistically Identify Authoritative Documents," 17th International Conference on Machine Learning, (Stanford 2000), pp. 167-174.

Craswell, Nick and David Hawking, "Overview of the TREC-2002 Web Track," 11th Text Retrieval Conference, Maryland 2002, pp. 1-10.

Craswell, Nick, David Hawking and Stephen Robertson, "Effective Site Finding using Link Anchor Information," 24th Annual International ACM SIGIR Conference on Research and Development in Information Retrieval, 2001, New Orleans, © 2001 ACM, pp. 250-257.

Davison, Brian, D., "Toward a Unification of Text and Link Analysis," SIGIR '03, Toronto, Canada, 2003, 2 pages.

Dhyani, Devanshu, Wee Keong Ng and Sourav S. Bhowmick, "A Survey of Web Metrics," ACM Computing Surveys, vol. 34, No. 4, Dec. 2002, pp. 469-503.

Embley, D.W., Y. Jiang and Y.-K Ng, "Record-boundary discovery in Web documents," In Proceedings of the 1999 ACM SIGMOD International Conference on Management of Data, Philadelphia, 1999, pp. 467-478.

European Search Report for European Patent Application No. 05104033.5, Microsoft Corporation, Sep. 20, 2005.

Fan, Weiguo, Michael D. Gordon and Praveen Pathak, "A generic ranking function discovery framework by genetic programming for information retrieval," Information Processing and Management, © 2003 Published by Elsevier Ltd., 16 pages.

Fiore, Andrew T., Scott Lee Teirnan and Marc A. Smith, "Observed Behavior and Perceived Value of Authors in Usenet Newsgroups: Bridging the Gap," In Proceedings of the CHI 2002 Conference on Human Factors in Computing Systems, Minnesota, 2002, vol. No. 4, Issue No. 1, © 2002 ACM, pp. 323-330.

Fujita, Sumio, "More Reflections on 'Aboutness' TREC-2001 Evaluation Experiments at Justsystem," In Proceedings of the Tenth Retrieval Conference (TREC 2001), Maryland, NIST Special Publication 500-250, 2002, 8 pages.

Garfield, Eugene, "Citation Analysis as a Tool in Journal Evaluation," Essays of an Information Scientist, vol. 1, 1962-1973, pp. 527-544.

Gey, Fredric C. et al., "Logistic regression at TREC4: Probabilistic Retrieval from Full Text Document Collections," In Proceedings of the 4th Text Retrieval Conference (TREC 4), Maryland, NIST Special Publication 500-236, 1996, 8 pages.

Gu, Xiao-Dong et al., "Visual Based Content Understanding towards Web Adaptation," In Proceedings of Second International Conference on Adaptive Hypermedia and Adaptive Web-based Systems, Spain, 2002, 10 pages.

Haveliwala, Taher H., "Topic-Sensitive PageRank: A Context-Sensitive Ranking Algorithm for Web Search," IEEE Transactions on Knowledge and Data Engineering, Jul./Aug. 2003, vol. 15, No. 4, © 2003 IEEE pp. 784-796.

Hearst, Marti A. and Christian Plaunt, "Subtopic Structuring for Full-Length Document Access," In Proceedings of the 16th Annual International ACM SIGIR Conference on Research and Development in Information Retrieval, Pittsburgh, 1993, pp. 1-10.

Herlocker, Jonathan L. et al., "An Algorithmic Framework for Performing Collaborative Filtering," 22nd annual international ACM SIGIR Conference on Research and Development in Information Retrieval, Berkley, 1999, pp. 230-237.

Kazai, Gabriella, Mounia Lalmas and Thomas Rolleke, "A Model for the Representation and Focussed Retrieval of Structured Documents based on Fuzzy Aggregation," In Proceedings of the 8th International Symposium on String Processing and Information Retrieval, Chile, 2001, pp. 1-18.

Kerschberg, Larry et al., "A Semantic Taxonomy-Based Personalizable Meta-Search Agent," Proceedings of the Second International Conference on Web Information Systems Engineering, Japan, Dec. 2001, © 2002 IEEE, pp. 41-50.

Kleinberg, Jon M., "Authoritative Sources in a Hyperlinked Environment," Journal of the ACM, vol. 46, No. 5, Sep. 1999, © 1999 ACM, pp. 604-632.

Lee, Joon Ho, "Analyses of Multiple Evidence Combination," In Proceedings of the 20th Annual International ACM SIGIR Conference on Research and Development in Information Retrieval, Pennsylvania, 1997, pp. 1-15.

Lee, Joon Ho, "Combining Multiple Evidence from Different Properties of Weighting Schemes," In Proceedings of the 18th Annual International ACM SIGIR Conference on Research and Development in Information Retrieval, Seattle, 1995, pp. 180-188.

Lempel, R. and S. Moran, "SALSA: The Stochastic Approach for Link-Structure Analysis," ACM Transactions on Information Systems, vol. 19, No. 2, Apr. 2001, © 2001 ACM, pp. 131-160.

Lewis, David D., "Applying Support Vector Machines to the TREC-2001 Batch Filtering and Routing Tasks," In Proceedings of the 10th Text Retrieval Conference, Maryland, NIST Special Publication 500-250, 2002, 7 pages.

Miller, Joel C., Gregory Rae and Fred Schaefer, "Modifications of Kleinberg's HITS Algorithm Using Matrix Exponentiation and Web Log Records," SIGIR'01, New Orleans, © 2001 ACM, pp. 444-445.

Mittendorf, Elke and Peter Schauble, "Document and Passage Retrieval Based on Hidden Markov Models," In Proceedings of the 17th Annual International ACM SIGIR Conference on Research and Development in Information Retrieval, Ireland, 1994, pp. 318-327.

Moffat, Alistair et al., "Retrieval of Partial Documents," In Proceedings of the Second Text Retrieval Conference (TREC-2), NIST Special Publication 500-215, 1994, 11 pages.

Ng, Andrew Y., et al., "Stable Algorithms for Link Analysis," SIGIR 2001, New Orleans, Louisiana, © 2001 ACM, 9 pages.

Ogilvie, Paul and Jamie Callan, "Combining Document Representations for Known-Item Search," In Proceedings of the 26th Annual International ACM SIGIR Conference on Research and Development in Information Retrieval, 2003, Canada, © 2003 ACM, pp. 143-150.

Pinski, Gabriel and Francis Narin, "Citation Influence for Journal Aggregates of Scientific Publications: Theory, with Application to the Literature of Physics," Information Processing & Management, vol. 12, No. 5, Pergamon Press 1976, pp. 297-312.

Robertson, S.E., "Overview of the Okapi Projects," Journal of Documentation, vol. 53, No. 1, Jan. 1997, pp. 3-7.

Salton, Gerald, J. Allan and C. Buckley, "Approaches to Passage Retrieval in Full Text Information Systems," In Proceedings of the 16th Annual International ACM SIGIR Conference on Research and Development in Information Retrieval, Pennsylvania, © 1993 ACM, pp. 49-58.

Shaw, Joseph A. and Edward A. Fox, "Combination of Multiple Searches," In Proceedings of the 3rd Text Retrieval Conference (TREC-3) Maryland, NIST Special Publication 500-250, 1995, 4 pages.

Theobald, Martin and Klas, Claus-Peter, "Bingo! and Daffodil: Personalized Exploration of Digital Libraries and Web Sources," Proceedings of the International World Wide Web Conference, Budapest, Hungary, May 20, 2003, 20 pages.

Tomlin, John A., "A New Paradigm for Ranking Pages on the World Wide Web," Proceedings of the International World Wide Web Conference, Budapest, Hungary, May 2003, pp. 350-355.

Vogt, Christopher C. and Garrison W. Cottrell, "Fusion Via Linear Combination for the Routing Problem," In Proceedings of the 6th Text Retrieval Conference (TREC 2001), NIST Special Publication 500-250, 2002, pp. 1-5.

Vogt, Christopher C. and Garrison W. Cottrell, "Predicting the Performance of Linearly Combined IR Systems," 21st Annual International ACM SIGIR Conference on Research and Development in Information Retrieval, Australia, Aug. 1998, pp. 1-7.

Wang, Ke and Ming-Yen Thomas Su, "Item Selection By 'Hub-Authority,' Profit Ranking," Proceedings of the 8th ACM SIGKDD International Conference on Knowledge Discovery and Data Mining, Edmonton, Canada, Jul. 2002, © 2002 ACM, pp. 652-657.

Wen, Ji-Rong et al., "Query Clustering Using User Logs," ACM Transactions on Information Systems, vol. 20, No. 1, Jan. 2002, pp. 59-81.

Xi, Wensi and Edward A. Fox, "Machine Learning Approach for Homepage Finding Task," In Proceedings of the 10th Text Retrieval Conference (TREC 2001), Maryland, NIST Special Publication 500-250, 2002, 12 pages.

Xi, Wensi et al., "Link Fusion: A Unified Link Analysis Framework for Multi-Type Interrelated Data Objects," WWW 2004, May, New York, ACM, pp. 319-327.

Xi, Wensi., "Combining Multiple Source of Evidence for Information Retrieval," Master Thesis, Nanyang Technological University, Singapore, Jul. 2000, 85 pages.

Xu, Jinxi and W.Bruce Croft, "Query Expansion Using Local and Global Document Analysis," In Proceeding of ACM-SIGIR Conference on Research and Development in Information Retrieval, Switzerland, 1996, 8 pages.

Yu, Shipeng et al., "Improving Pseudo-Relevance Feedback in Web Information Retrieval Using Web Page Segmentation," In Proceeding of the 12th World Wide Web conference, Hungary, 2003, pp. 11-18.

Zobel, Justin et al., "Efficient Retrieval of Partial Documents," Information Processing & Management, vol. 31 (3), 1995, pp. 1-21.

* cited by examiner

METHOD AND SYSTEM FOR RANKING MESSAGES OF DISCUSSION THREADS

CROSS-REFERENCE TO RELATED APPLICATION(S)

This application is a continuation-in-part of U.S. patent application Ser. No. 10/957,329, filed on Oct. 1, 2004 and entitled "Method and System for Identifying Questions Within a Discussion Thread," and U.S. patent application Ser. No. 10/846,835, filed on May 14, 2004 now U.S. Pat. No. 7,346,621 and entitled "Method and System for Ranking Objects Based on Intra-Type and Inter-Type Relationships," which are hereby incorporated by reference.

TECHNICAL FIELD

The described technology relates generally to ranking of messages of a discussion thread.

BACKGROUND

Discussion threads are a popular way for people to communicate using the Internet. A discussion thread, such as a newsgroup, allows people to participate in a discussion about a specific topic. A discussion thread is typically initiated when a person creates an initial message directed to a topic and posts the message as a new discussion thread. Other persons can read the initial message and post response (or reply) messages to the discussion thread. For example, the initial message may pose a question such as "Has anyone encountered a situation where the Acme software product aborts with error number 456?" Persons who want to participate in the discussion can post response messages such as "It happens to me all the time" or "I fixed the problem by reinstalling the software." Discussion threads typically take the form of a tree structure as sequences of messages branch off into different paths. For example, three different persons can post a response message to the initial message, starting three branches, and other persons can post response messages to any one of those response messages to extend those branches.

In general, discussion threads include questions and their answers. For example, a customer support group within a company that sells a certain software product may provide a mechanism for its customers to create and participate in discussion threads relating to the software product. For example, a customer may initiate a discussion thread by posting an initial message that poses a question such as the one mentioned above. That question may be answered by the posting of a response message by another customer or a customer service representative. The corpus of discussion threads of the company may provide a vast amount of knowledge related to problems and concerns that customers may encounter along with appropriate responses (e.g., answers to questions posed).

When a customer wants an answer to a question, the customer may either initiate a new discussion thread or search messages of existing discussion threads that may provide an answer to the customer's question. When searching for an answer within the message of a corpus of discussion threads, a customer may submit a short query using keywords of the question. For example, the customer may submit the query "error 456" in hopes of finding an answer to the question mentioned above. A search engine may be used to identify those messages that contain keywords matching the query. The search engine may rank messages based on a relevance score that indicates how relevant each message is to the query based on closeness of each match, date of message (e.g., recent messages being more relevant), length of message, and so on. The ranking may be based primarily on attributes of the messages themselves.

The relevance score, however, may fail to factor in attributes that are not directly related to messages. For example, the relevance of a message might more accurately be determined when the expertise of the author is factored in. A response message posted by a customer service representative may be more authoritative or important, and thus more relevant, than a response message posted by a customer. It would be desirable to have a technique for calculating importance of messages of a discussion thread based on attributes not directly related to the message.

SUMMARY

A method and system for ranking messages of a discussion thread based on relationships with other messages and with authors is provided. The ranking system ranks messages based in part on relationships between and attributes of messages and authors. A message may have an importance attribute, and an author may have an expertise attribute. The importance of a message may be based on importance of related messages and the expertise of its author. The expertise of an author may be based on the importance of the messages posted by the author. The ranking system calculates the value of the importance attribute for the messages and may rank the messages based on their importance.

DETAILED DESCRIPTION

Figure 1:
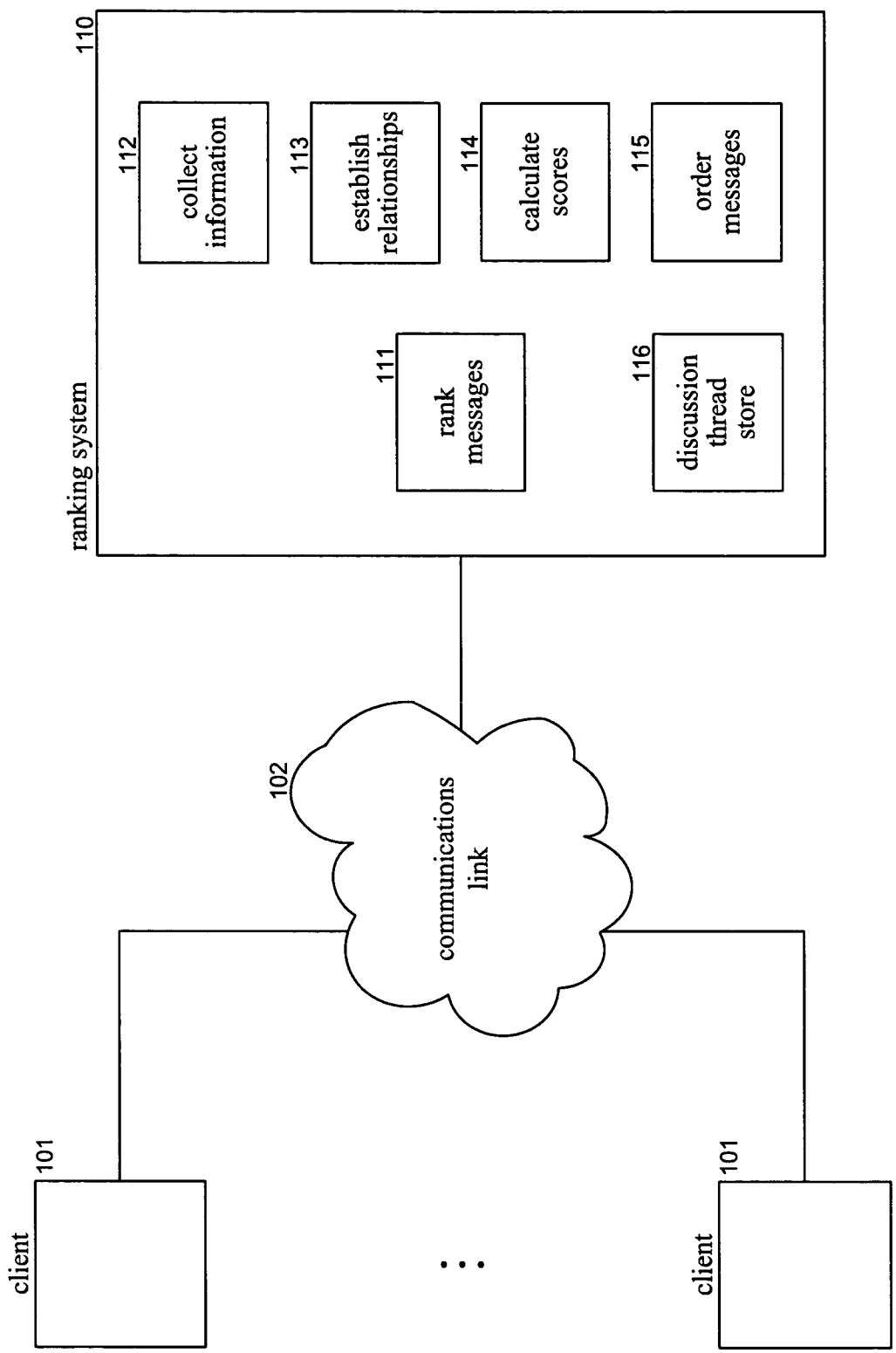
FIG. 1 is a flow diagram that illustrates components of the ranking system in one embodiment.

A method and system for ranking message objects ("messages") of a discussion thread based on relationships with other messages and with other types of objects is provided. In one embodiment, the ranking system ranks messages based in part on relationships between and attributes of authors and messages. A message may have an importance attribute, and an author may have an expertise attribute. The importance of a message may be based on the importance of related messages (e.g., reply messages) and the expertise of its author. The expertise of an author may be based on the importance of the messages posted by the author. Thus, the importance of a message and the expertise of its author are defined recursively. The ranking system calculates the value of the importance attribute for the messages and may rank the messages based on their importance.

The ranking system determines various relationships between objects of the same type, referred to as intra-type relationships, and between objects of different types, referred to as inter-type relationships. The intra-type relationships messages may include replied-to relationships between messages. For example, if a message is a reply to another message, then that message has a replied-to relationship to the replied-to message. The intra-type relationship of authors may include a self relationship that is each author is only related to itself. The inter-type relationships between messages and authors may be based on authored-by and author-of relationships. A message has an authored-by relationship to its author, and an author has an author-of relationship to the authored message. The ranking system uses the replied-to relationships and the authored-by and author-of relationships to derive the importance of messages and the expertise of authors.

In one embodiment, the ranking system represents the relationships and attributes using a set of equations, such as linear equations. The ranking system represents the importance of messages and expertise of authors using a linear equation that may be defined recursively. Because the linear equations may be defined recursively, the ranking system solves the linear equations by iteratively calculating the values of each linear equation until the values converge on a solution. After solving the linear equations, the ranking system may rank the messages based on their importance.

The ranking system represents the attribute values for objects based on the intra-type and inter-type relationships of the objects. The value of an attribute may be represented by the following equation:

$$F_i = F_i R_i + \Sigma_{j \ne i} F_j R_{ji}$$

where $F_i$ represents the attribute value associated with object i, $R_i$ represents the intra-type relationships between objects of the type of the object i, and $R_{ji}$ represents the inter-type relationships between objects of the type of the object i and other types j. If there are two types of objects $x = \{x_1, x_2, \ldots x_m\}$ representing messages and $y = \{y_1, y_2, \ldots y_n\}$ representing authors, then the intra-type replied-to relationship for messages can be represented as $R_X$ and the intra-type self relationship for authors can be represented as $R_Y$ and their inter-type authored-by relationship represented as $R_{XY}$ and inter-type author-of relationship represented as $R_{YX}$. The ranking system uses adjacency matrices to represent the relationship information. $L_X$ and $L_Y$ represent the adjacency matrices of the intra-type relationships for messages and authors, respectively. $L_{XY}$ and $L_{YX}$ represent the adjacency matrix of inter-type authored-by relationships from messages to authors and the adjacency matrix of inter-type author-of relationships from authors to messages, respectively. The ranking system represents the adjacency matrix by the following:

$$L_{XY}(i, j) = \begin{cases} 1 & \text{if there is a relationship from object } x_i \text{ to object } y_j \\ 0 & \text{otherwise} \end{cases}$$

where $L_{XY}(i,j)$ indicates whether a relationship exists from message i to author j. The linear equations for the attribute values can be represented as the following equations:

$$w_y = L_y^T w_y + L_{xy}^T w_x$$

$$w_x = L_x^T w_x + L_{yx}^T w_y \quad (1)$$

where $w_x$ is the attribute vector of message in X and $w_y$ is the attribute vector of author in Y. Equation 1 can be generalized to the following form:

$$w_M = L_M^T w_M + \sum_{\forall N \ne M} L_{NM}^T w_N \quad (2)$$

where M represents the matrix of attribute vectors.

Because mutually reinforcing relationships between objects may give undue attribute values to objects, the ranking system may normalize the binary adjacency matrices in such a way that if an object is related to n other objects in one adjacency matrix, then each related-to object gets $1/n^{th}$ of its attribute value. The ranking system may also introduce the random surfer model of PageRank to simulate random relationships and thus avoid sink nodes during computation as described below. In addition, since attributes from different types may have different importance to each other attribute, the ranking system may use weights for each combination of types. Thus, the ranking system may factor in the normalization, the random surfer model, and the weights to represent the attribute values by the following equation:

$$w_M = \alpha_M L_M'^T w_M + \beta_{NM} \sum_{\forall N \ne M} L_{NM}'^T w_N \quad (3)$$

where $$\alpha_M + \sum_{\forall N \ne M} \beta_{NM} = 1; \alpha_M > 0 \beta_{NM} > 0;$$

$$L_M' = \varepsilon U + (1 - \varepsilon) L_M; 0 < \varepsilon < 1;$$

$$L_{NM}' = \delta_N U + (1 - \delta_N) L_{NM}; 0 < \delta_N < 1.$$

where U is a transition matrix of uniform transition probabilities ($u_{ij} = 1/n$ for all i, j; where n is the total number of objects in data space N), $L_M$ and $L_{NM}$ are normalized adjacency matrices, $\delta$ and $\varepsilon$ are smoothing factors used to simulate random relationships in matrices $L_M$ and $L_{NM}$, and $\alpha_M$ and $\beta_{NM}$ represent the weights of the relationships. The ranking system iteratively calculates Equation 3 until it converges. Equation 3 can be represented by a unified square matrix A that is represented by the following equation:

$$A = \begin{vmatrix} \alpha_1 L_1' & \beta_{12} L_{12}' & \cdots & \beta_{1n} L_{1n}' \\ \beta_{21} L_{21}' & \alpha_2 L_2' & \cdots & \beta_{2n} L_{2n}' \\ \vdots & \vdots & \ddots & \vdots \\ \beta_{n1} L_{n1}' & \beta_{n2} L_{n2}' & \cdots & \alpha_n L_n' \end{vmatrix} \quad (4)$$

Matrix A has $L'_M$ on the diagonal, and $L'_{NM}$ in other parts of the unified matrix. The ranking system uses an iterative approach to transform the vector w, which is the attribute vector of all the data objects in different data spaces, using matrix A (e.g., $w = A^T w$). When the iterations converge, vector w is the principal eigenvector of matrix A.

When M and N are heterogeneous data spaces, the ranking system uses a random relationship to represent no relationship. When an object in M has no relationship to any objects in N, then the sub-matrix $L'_{NM}{}^T$ will be zero and will represent a "sink node" to which the calculations may assign all the attribute value. To prevent this, the ranking system sets all the elements in the corresponding row of the sub-matrix $L'_{NM}{}^T$ to $1/n$, where n is the total number of objects in data space N. Alternatively, the ranking system can set the corresponding weights to 0 for undesired intra-type and inter-type relationships. However, if $\beta_{MN}$ is greater than 0, then $\beta_{NM}$ may need to be greater than 0 if the iterative calculations are to converge. Thus, if the relationship of $L'_{NM}{}^T$ is undesired, the ranking system sets $\beta_{NM}$ to a very small positive weight to reduce the effect of $L'_{NM}{}^T$.

By constructing a unified matrix using all the adjacency matrices, the ranking system constructs a unified data space, which contains different types of objects. Thus, previous inter-type relationships can be considered as intra-type relationships in the unified space, and the ranking system effectively results in link analysis in a single data space.

FIG. 1 is a flow diagram that illustrates components of the ranking system in one embodiment. The ranking system 110 is connected to various clients 101 via communications link 102. The ranking system includes a rank messages component 111 that invokes a collect information component 112, an establish relationships component 113, a calculate scores component 114, and an order messages component 115 to rank messages. The ranking system also includes a discussion thread store 116 that contains the messages of the discussion threads. The rank messages component may receive a set of messages and rank the messages based on intra-type and inter-type relationships. The collect information component retrieves relationship information relating to messages and authors. The establish relationships component creates the intra-type and inter-type relationship matrices. A relationship matrix may map messages to messages or messages to their authors. The calculate scores component recursively calculates the attribute values using Equation 3 until the attribute values converge on a solution. The order messages component sorts the messages based on their importance.

The computing device on which the ranking system is implemented may include a central processing unit, storage memory, input devices (e.g., keyboard and pointing devices), output devices (e.g., display devices), and computer-readable storage mediums (e.g., disk drives). The memory and storage devices are computer-readable media that may contain instructions that implement the ranking system. Various communications links may be used, such as the Internet, a local area network, a wide area network, or a point-to-point dial-up connection.

The ranking system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
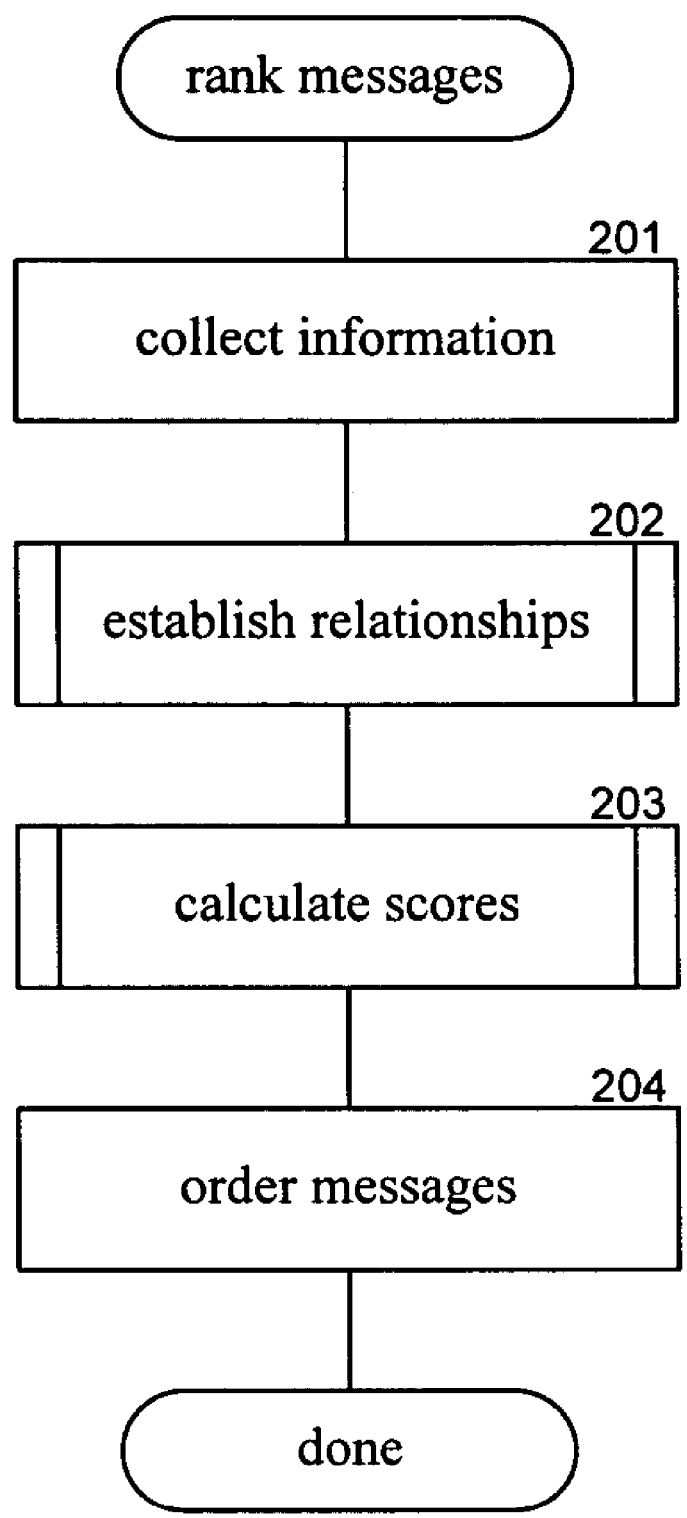
FIG. 2 is a flow diagram that illustrates the processing of the rank messages component in one embodiment.

FIG. 2 is a flow diagram that illustrates the processing of the rank messages component in one embodiment. The component collects information for messages and authors, establishes relationships between messages and between messages and authors, calculates importance and expertise values for the messages and authors, and orders the messages based on the calculated importance. In block 201, the component collects information relating to the messages and authors from the discussion thread store. In block 202, the component invokes the establish relationships component to generate the adjacency matrices. The establish relationships component may also retrieve and adjust the $\alpha$ and $\beta$ weights. In block 203, the component invokes the calculate scores component to iteratively calculate the importance and expertise values until they converge on a solution. In block 204, the component orders the messages based on their importance values and then completes.

Figure 3:
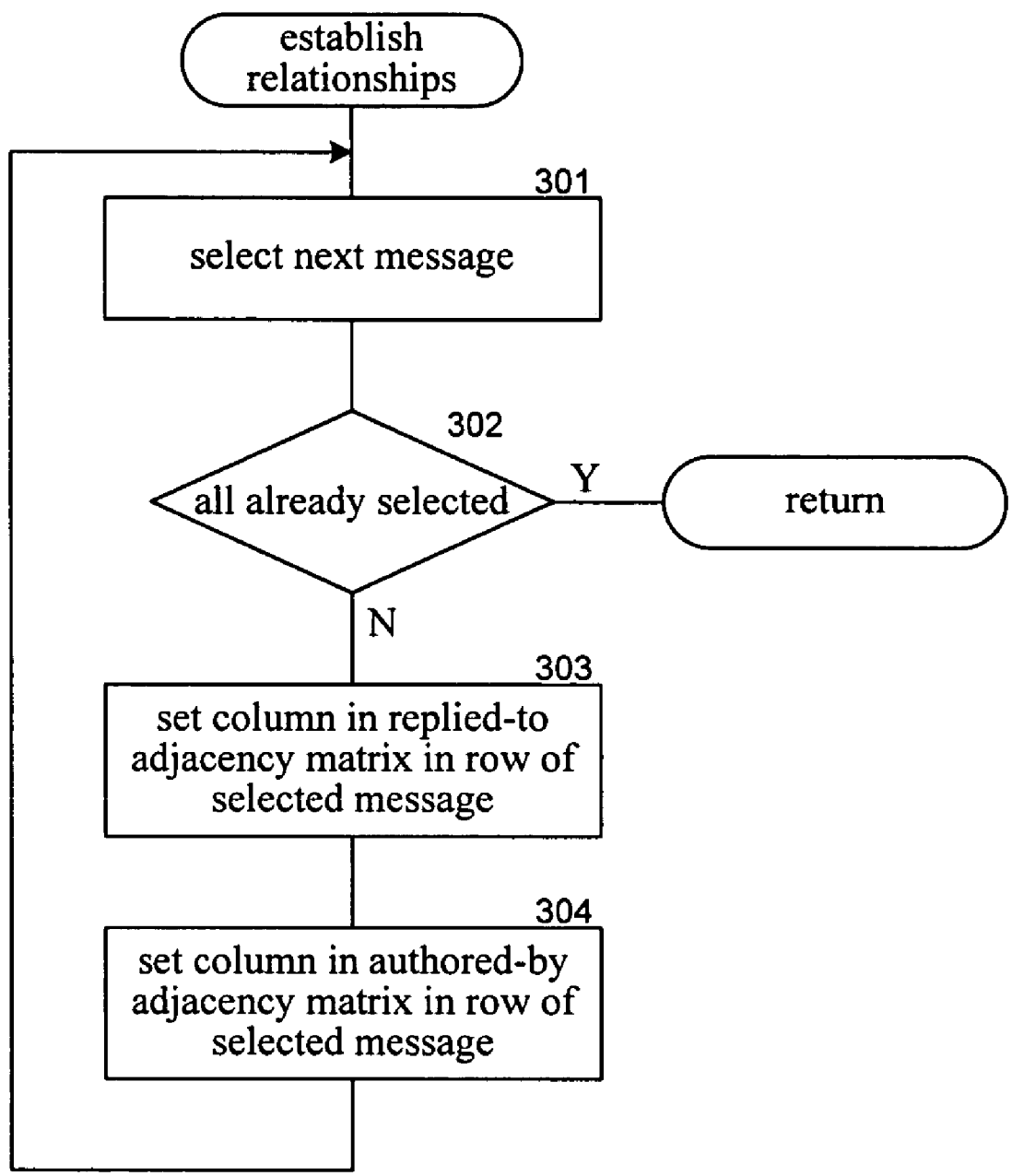
FIG. 3 is a flow diagram that illustrates the processing of the establish relationships component in one embodiment.

FIG. 3 is a flow diagram that illustrates the processing of the establish relationships component in one embodiment. The component establishes the adjacency matrices for messages and authors. In blocks 301-304, the component loops establishing the adjacency matrices for the replied-to relationships and for the authored-by relationships. In block 301, the component selects the next message. In decision block 302, if all the messages have already been selected, then the component completes, else the component continues at block 303. In block 303, the component sets the entry in a row of the replied-to adjacency matrix for the selected message to indicate the replied-to message. The adjacency matrix is a square matrix with each row indicating the message that the message of the row replies to. Each row may only have one entry set, whereas a column may have multiple entries set to indicate that multiple messages replied to the message of the column. In block 304, the component sets the entry in a row of the authored-by adjacency matrix for the selected message to indicate the author and loops to block 301 to select the next message. The adjacency matrix may have a row for each message and a column for each author. A row may have only one entry set since it may have only one author. The author-of adjacency matrix is the transpose of the authored-by adjacency matrix.

Figure 4:
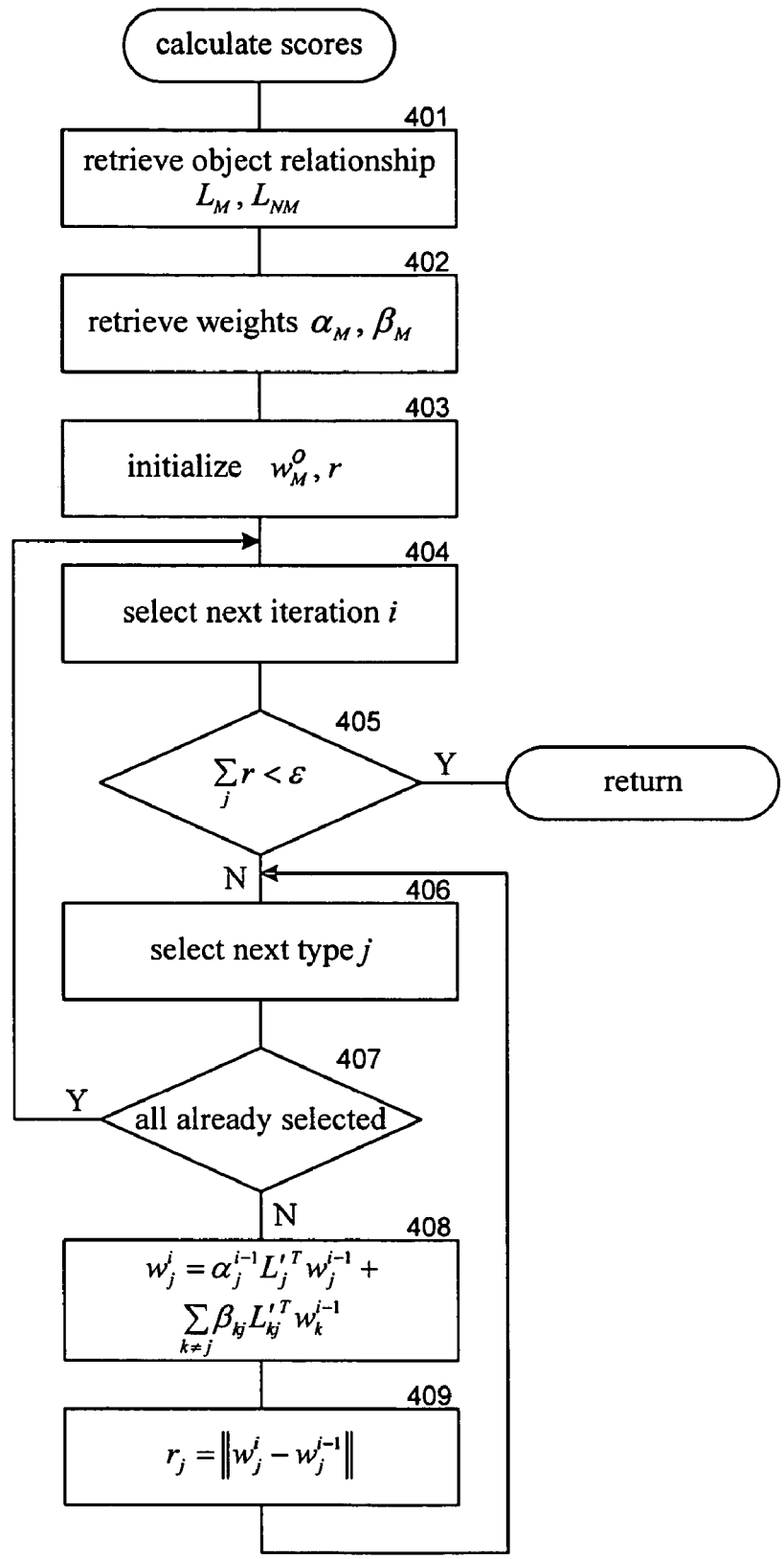
FIG. 4 is a flow diagram that illustrates the processing of the calculate scores component in one embodiment.

FIG. 4 is a flow diagram that illustrates the processing of the calculate scores component in one embodiment. The component iteratively calculates the equations until the attribute values converge. In block 401, the component retrieves the relationships represented by the adjacency matrices. In block 402, the component retrieves the weights $\alpha$ and $\beta$ for the intra-type and inter-type relationships. In block 403, the component initializes the vector w for the importance and expertise attributes to have an equal attribute value for each message or author. The component may set each value to 1/m, where m is the number of objects of the type. For example, if there are 10 authors, then the component sets the initial values for the expertise attribute to $\frac{1}{10}$. The component also initializes a difference variable for each type to a large value so that the component will initially pass the test of decision block 405. The component calculates the new value for each difference variable at the end of each iteration for determining whether the calculations have converged to a solution. In blocks 404-409, the component performs the calculations of Equation 3 until the calculations converge on a solution. In block 404, the component starts the next iteration. In decision block 405, if the sum of the differences calculated during the last iteration is less than a difference threshold, then the calculations have converged on a solution and the component returns, else the component continues at block 406. In block 406, the component selects the next object (e.g., message and author). In decision block 407, if all the objects have already been selected, then the component loops to block 404 to start the next iteration, else the component continues at block 408. In block 408, the component calculates the values for the selected object based on the values calculated in the previous iteration. In block 409, the component calculates the difference between the values of this iteration and the values of the previous iteration for the selected object. The component then loops to block 406 to select the next object.

One skilled in the art will appreciate that although specific embodiments of the ranking system have been described herein for purposes of illustration, various modifications may be made without deviating from the spirit and scope of the invention. For example, one skilled in the art will appreciate that non-linear equations may be used to represent attribute values. One skilled in the art will also appreciate that different attributes, objects (other than authors), and relationships can be used to determine the authority or importance of messages. For example, the expertise or importance of an author may be based on the relationship between the author and various organizations (e.g., customer service department of a company) or number of times a message has been accessed. One skilled in the art will appreciate that the ranking system can be used to rank any collection of messages of discussion threads. For example, a collection of messages can be identified based on the techniques of U.S. patent application Ser. No. 10/957,329, filed on Oct. 1, 2004 and entitled "Method and System for Identifying Questions Within a Discussion Thread." Accordingly, the invention is not limited except as by the appended claims.

We claim:

1. A method in a computer system for determining importance of a message of a discussion thread, the method comprising:
    providing messages of a discussion thread, each message having an author;
    identifying replied-to relationships between messages indicating which messages are replies to which other messages;
    identifying authored-by relationships between messages and authors; and calculating and storing a value for an importance attribute of each message and a value for an expertise attribute of each author based on the replied-to and authored-by relationships, such that the importance attribute of a message is based on the expertise attribute of the author of the message and the importance attribute of messages that are replies to the message and such that the expertise attribute of the author of a message is based in part on the importance attribute of the message, wherein the value of the importance attribute indicates the importance of a message and including defining a function for the importance attribute and a function for the expertise attribute, wherein the function representing an attribute of an object is represented as $F_i = F_i R_i + \Sigma_{j \neq i} F_j R_{ji}$ where $F_i$ represents the attribute value associated with object i, $R_i$ represents intra-type relationships between objects of the type of the object i, and $R_{ji}$ represents inter-type relationships between objects of the type of the object i and other types j, the messages and authors being objects.

2. The method of claim 1 including providing an equation for the importance attribute of messages and an equation for the expertise attribute of authors.

3. The method of claim 2 wherein the calculating includes iteratively solving the equations.

4. The method of claim 2 wherein the equations are defined recursively based on attribute values of other equations.

5. The method of claim 1 wherein the providing of messages of the discussion thread includes identifying messages that match a query.

6. The method of claim 1 including ranking the provided messages based on their importance.

7. The method of claim 1 including after calculating the importance of messages, identifying messages and ranking the identified messages based on their calculated importance.

8. A method in a computer system for determining importance of a message of a discussion thread, the method comprising:
    providing messages of a discussion thread, each message having an author;
    identifying replied-to relationships between messages indicating which messages are replies to which other messages;
    identifying authored-by relationships between messages and authors; and
    calculating and storing a value for an importance attribute of each message and a value for an expertise attribute of each author based on the replied-to and authored-by relationships, such that the importance attribute of a message is based on the expertise attribute of the author of the message and the importance attribute of messages that are replies to the message and such that the expertise attribute of the author of a message is based in part on the importance attribute of the message,
wherein the value of the importance attribute indicates the importance of a message and including defining a function for the importance attribute and a function for the expertise attribute, and wherein a combined function representing an importance attribute and an expertise attribute is represented as $$w_M = \alpha_M L_M^T w_M + \beta_{NM} \sum_{\forall N \neq M} L_{NM}^T w_N$$

where U is a transition matrix of uniform transition probabilities ($u_{ij}=1/n$ for all i, j; where n is the total number of objects in data space N), $L_M$ and $L_{NM}$ are normalized adjacency matrices, $\delta$ and $\epsilon$ are smoothing factors used to simulate random relationships in matrices $L_M$ and $L_{NM}$, and $\alpha_M$ and $\beta_{NM}$ represent the weights of the relationships and wherein the objects are messages and authors.

* * * * *